United States Patent [19]

Patch

[11] 3,807,519
[45] Apr. 30, 1974

[54] MOTIVE DRIVE FOR HEAVY MACHINERY
[76] Inventor: William D. Patch, P.O. Box 95, Welch, Okla. 74369
[22] Filed: May 25, 1972
[21] Appl. No.: 256,675

[52] U.S. Cl.............................................. 180/8 C
[51] Int. Cl............................................ B62d 57/02
[58] Field of Search....................................... 180/8

[56] References Cited
UNITED STATES PATENTS
3,512,597  5/1970  Baron............................. 180/8 C R
2,914,127  11/1959  Ricouard........................ 180/8 C R
2,785,761  3/1957  Becker............................ 180/8 C R Primary Examiner—Leo Friaglia
Assistant Examiner—Randall A. Schrecengost
Attorney, Agent, or Firm—Schmidt, Johnson, Hovey & Williams

[57] ABSTRACT

Walking mechanism for moving a ground-engaging device, such as large earth-working machinery, over open terrain including soft ground. The mechanism includes a pair of assemblies, each of which has a support pad, and drive and weight-transferring cylinders connected between the device and the pad. Hydraulic control circuitry for each assembly sequentially slides the pad and the device in separate steps along the ground with the operation of the two assemblies being controlled and timed to create continuous or discontinuous movement of the device as well as to provide reversing and turning movements of the device.

25 Claims, 13 Drawing Figures

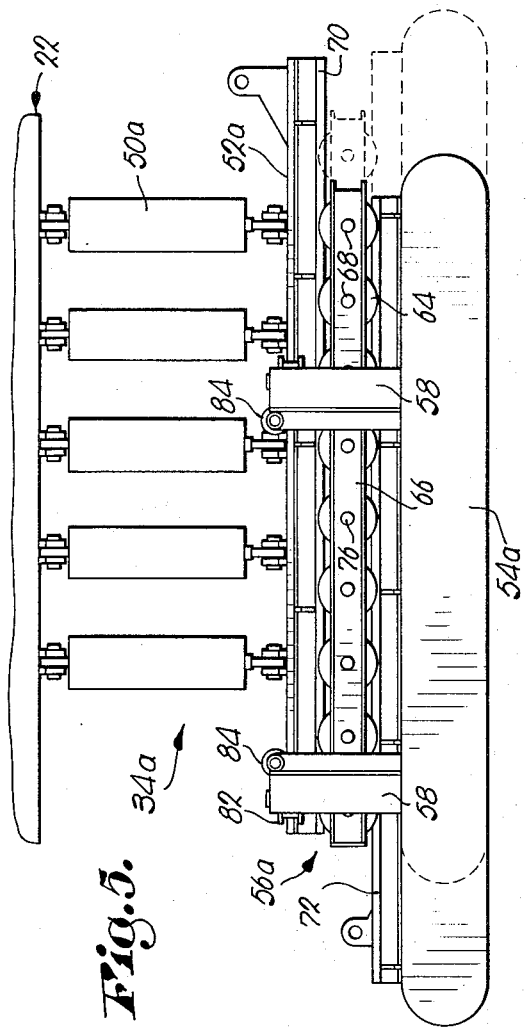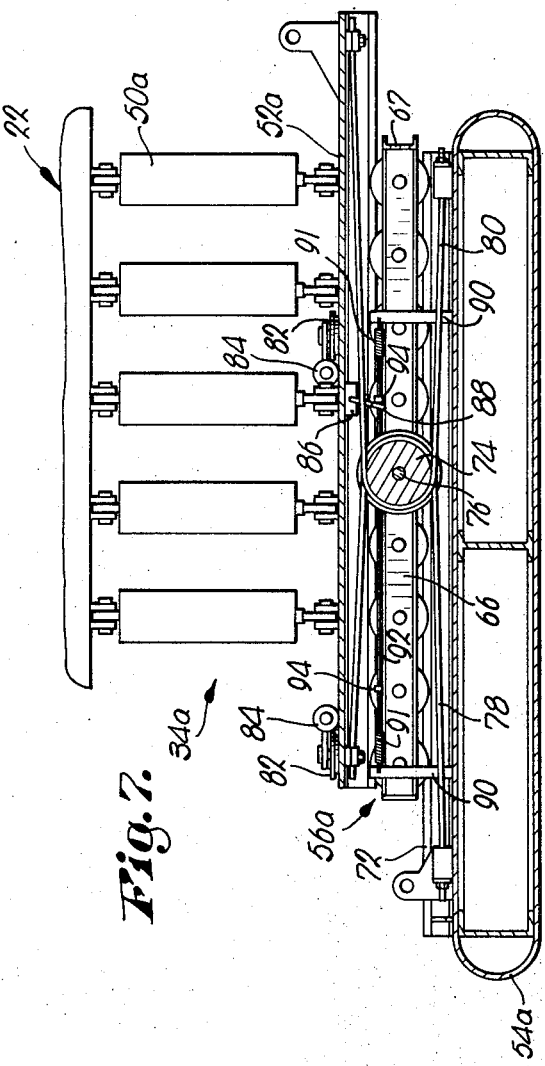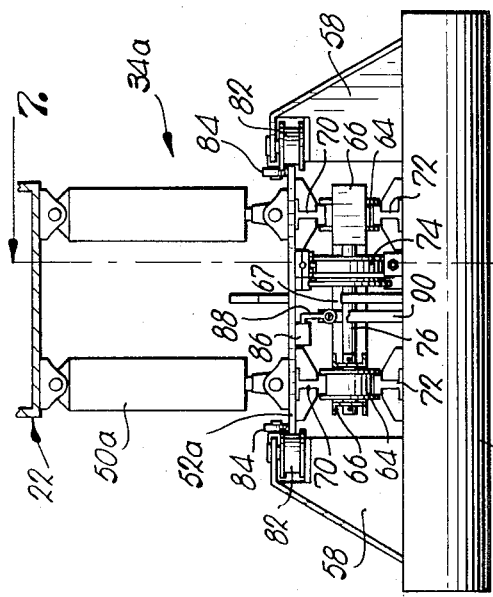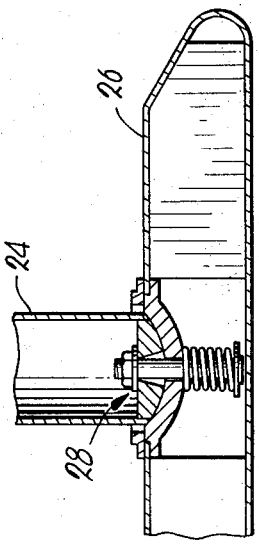

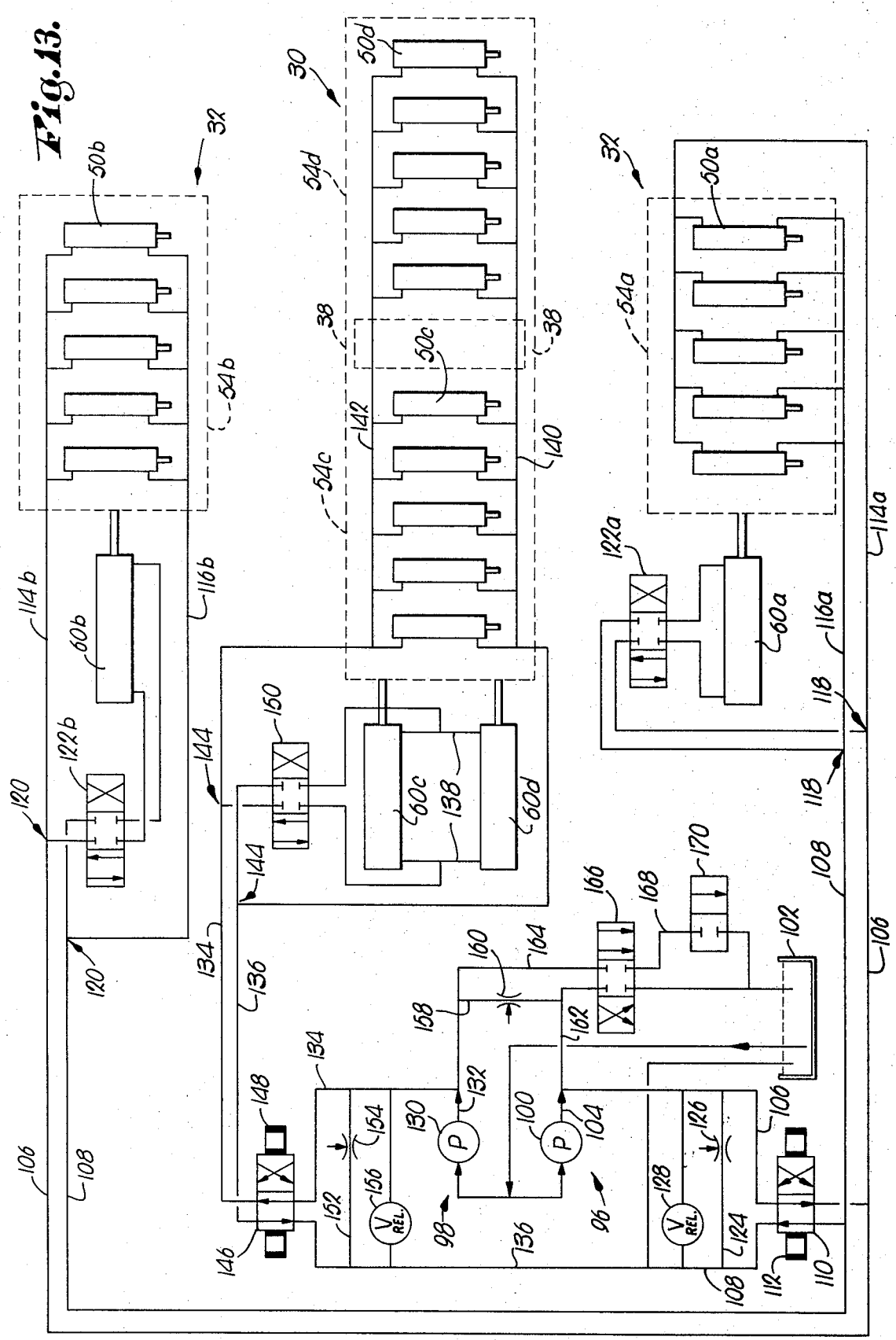

MOTIVE DRIVE FOR HEAVY MACHINERY

This invention relates to motive walking mechanisms for ground vehicles.

Motive walking mechanisms now known within the art operate upon the principle of stepping the device along the ground, that is alternately lifting the device up and down off the ground as it moves. Such devices are usually quite complicated and expensive in structure and introduce relatively large axle stress problems while lifting the device or machinery up and down. These problems are extremely critical when the machinery is extremely large and heavy in nature. For instance, large shovels such as utilized in coal strip-mining are particularly difficult to maneuver while working and normally require expensive dismantling and reassembling thereof when transporting the device through even short distances between different working sites. Such relative immobility has rendered the recovery of smaller coal deposits unprofitable.

It has been found most feasible in the past to mount and maneuver such machinery upon railroad tracks. A corollary to the above approach is known in certain machinery, such as walking draglines, wherein the machinery, in essence, lays its own track as it is maneuvered. Other proposals for making such machinery self-propelled and thereby more maneuverable, have centered around the prior art concept of walking mechanisms that lift the device up-and-down off the ground. All of these approaches have met with limited success and none operate adequately on soft ground and across varying terrain. The complicated and expensive nature of prior art walking mechanisms, along with the frequent breakdowns associated with the large stresses presented, has greatly limited the maneuverability.

Accordingly, it is a broad object of the present invention to provide improved walking mechanism of simple, economical design which can be easily installed and removed from various devices and which slides the device along the terrain rather than lifting it up-and-down in order to greatly increase the resulting maneuverability.

An important object of the invention is to provide a walking mechanism for a ground-engaging device that is capable of moving the device over open terrain, yet which introduces minimal stress and attendant breakdown.

A more particular object is to provide a walking mechanism that includes an assembly comprising a ground-engageable support pad, weight-transferring means for selectively relieving and loading the pad with a majority of the weight of the device, drive means extending between the device and the pad for alternately shifting the pad and device in separate steps in the same direction, and control means for actuating the drive means in a device-moving step while the pad is loaded and in a pad-moving step while the pad is unloaded, and thereby slide the device along the ground.

An important corollary to the preceding object is to provide two assemblies of the type described whose control means are timed to create a continuous sliding movement of the device along the terrain.

Another object in accordance with the preceding is to provide control means which actuate both the weight-transferring means and drive means in correlation and which act automatically by being responsive to the hydraulic pressure required to initiate the device-moving step.

A further object is to provide walking mechanism of the type described which can effect turning of the device to increase the maneuverability thereof.

A further object of this invention is to provide simplified hydraulic controls for achieving automatically the sequential pad-moving and device-moving steps.

A more particular object of the invention is to provide upright weight-bearing cylinders as the weight-transferring means, and generally transversely extending drive cylinders as the drive means, the cylinders being interconnected so that the control means simultaneously supply motive fluid to the cylinders to create the desired automatic, pressure-sensitive operation.

These and other more particular objects and advantages of the present invention are specifically set forth in or will become apparent from the following detailed description of a preferred embodiment of the invention when read in conjunction with the accompanying drawings, wherein:

FIG. 5 is an enlarged, side elevational view of one of the side assemblies and showing details of construction;

FIG. 6 is a rear elevational view of the side assembly illustrated in FIG. 5;

FIG. 7 is an elevational, cross-sectional view taken along line 7—7 of FIG. 6;

FIG. 8 is an enlarged, fragmentary, cross-sectional view of one of the corner foot and leg arrangements of the device;

FIG. 13 is a schematic representation of the hydraulic control means as coupled with the walking mechanism.

Figure 1:
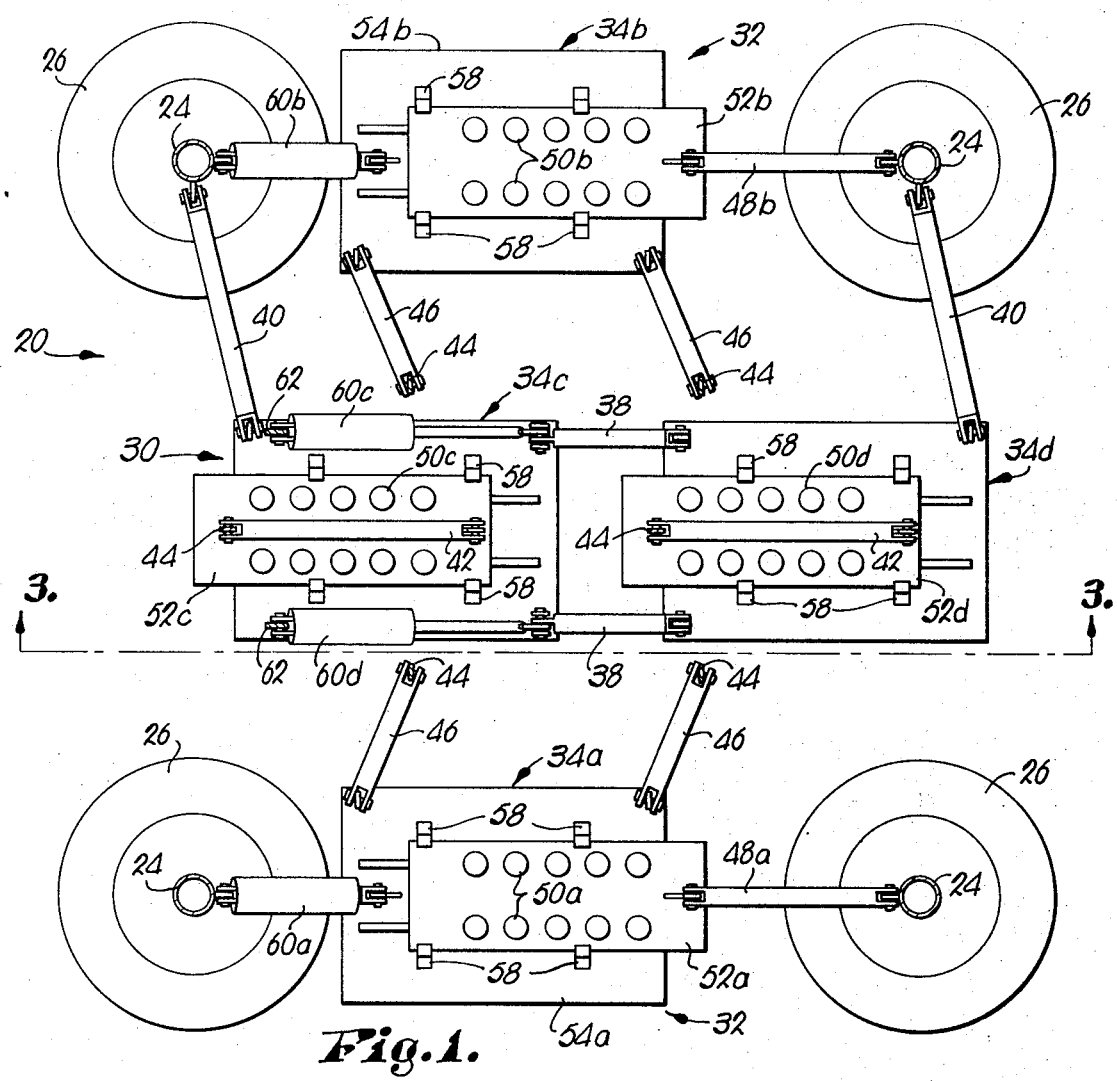
FIG. 1 is a top plan view of a walking mechanism constructed in accordance with the principles of this invention and as utilized in conjunction with a ground-engaging device partially shown.
Figure 2:
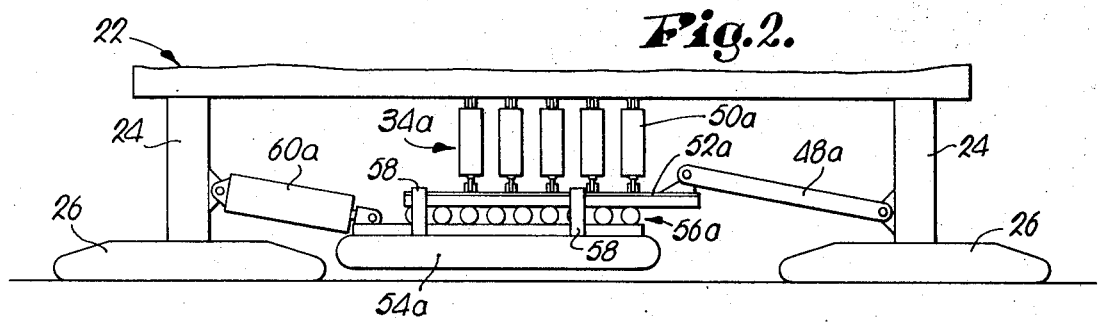
FIG. 2 is a side elevational view of the mechanism of FIG. 1.
Figure 3:
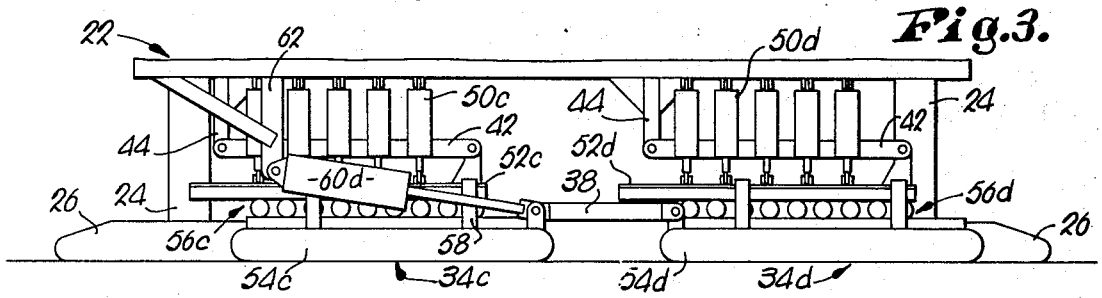
FIG. 3 is a side elevational view taken along line 3—3 of FIG. 1 and showing the center assembly of the walking mechanism.
Figure 4:
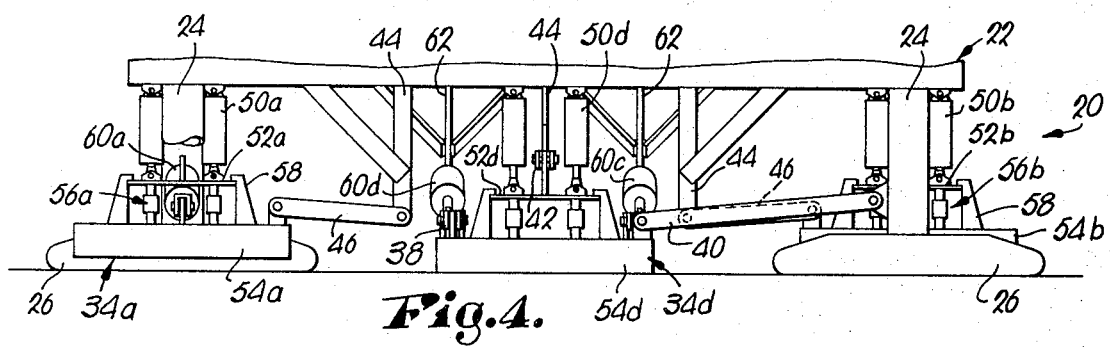
FIG. 4 is a front elevational view of the walking mechanism of FIG. 1.

Referring now more particularly to FIGS. 1–4, a walking mechanism generally referred to by the numeral 20, is disposed below as a part of the undercarriage of a partially illustrated ground-engaging device 22. Device 22 includes four tubular corner legs 24 joined to a corresponding foot 26 that presents a relatively large bottom surface area engaging and sliding upon the ground. A universal joint 28 (FIG. 8) swivelly attaches the foot 26 to the associated leg 24 in order to permit relative motion therebetween as the foot slides along uneven terrain.

Walking mechanism 20 generally comprises a center assembly 30 and a side assembly 32, the latter comprising first and second structural sets 34a and 34b disposed at opposite sides of device 22. Center assembly 30 similarly includes longitudinally aligned structural sets 34c and 34d which are rigidly interconnected by beams 38 to operate as a single unit. Corner and center support braces 40 and 42 respectively secure the center assembly 30 to the corner legs 24 and depending central support beams 44 of device 22. Similarly, side struts 46 attach side sets 34a and 34b to depending support beams 44 of the device. Associated support members 48a and 48b pivotally secure the respective structural sets 34a and 34b to an adjacent leg of the device to assist in maintaining longitudinal alignment of the side sets 34a and 34b in relation to device 22.

Each of the structural sets 34a–34d are quite similar in construction and accordingly, the following description of set 34a applies generally to the other sets 34b–34d. Set 34a includes a group of 10 upright, weight-bearing hydraulic cylinders 50a whose upper ends are pivotally, rigidly secured to the underside of device 22, and whose lower ends are pivotally attached to a common plate 52a. Support member 48a is secured to plate 52a to hold the latter and cylinders 50a relatively stationary to device 22. Underlying plate 52a is a support pad 54a that has a large bottom surface area for engagement with the ground.

Struts 46 are pivotally attached to pad 54a to permit it to move longitudinally relative to device 22. Set 34b is similarly supported by struts 46 and member 48b. Sets 34c and 34d have corner braces 40 pivotally attached to pads 54c and 54d to permit longitudinal movement thereof, along with the center braces 42 that hold plates 52c and 52d against longitudinal movement relative to device 22.

Roller means 56a are disposed intermediate plate 52a and pad 54a to permit relative longitudinal movement therebetween while supports 58 operatively attach pad 54a to the upper plate 52a and cylinders 50a. Hydraulic motor drive means in the form of a double-acting, generally transversely extending, linear drive cylinder 60a extends between pad 54a and one leg 24 of the device, with opposite ends respectively attached to pad 54a and leg 24. The other side set 34b has a similarly disposed drive cylinder 60b, while for center assembly 30, there are provided a pair of drive cylinders 60c and 60d with opposite ends pivotally affixed to plate 54c and supports 62 that depend downwardly from device 22.

Referring now more particularly to FIGS. 5–7, the roller means 56a includes a plurality of longitudinally aligned rollers 64 secured as a unit by channels 66 through associated center axles 68. Rollers 64 roll upon upper and lower tracks 70 and 72 respectively mounted upon plate 52a and pad 54a in facing relationship. As best seen in FIG. 6, the roller means 56a includes two sets of rollers 64 and tracks 70 and 72 located in parallel, longitudinal alignment to each other. The channels 66 of each set of rollers and interconnecting transverse end channel 67 together define a rigid frame for the rollers. To constrain the roller means 56a between plate 52a and pad 54a, there is included a central wheel 74 mounted upon a transverse spindle 76 that extends through the channel 66 of both sets of rollers. A pair of steel cables 78 and 80 wrap around wheel 74 in opposite directions and have opposite ends secured to pad 54a and plate 52a so that, upon relative longitudinal movement between plate 52a and pad 54a, the cables 78 and 80 will hold the roller means 56a therebetween.

The supports 58 disposed at opposite sides of plate 52a carry horizontal and vertical rollers 82 and 84. Horizontal rollers 82 assist in maintaining general alignment of pad 54a to plate 52a, while vertical rollers 84 engage the upper surface of plate 52a so that, upon retraction of upright cylinders 50a, a lifting action is transferred to pad 54a through rollers 84 and supports 58. It will again be noted that the above described structure of set 34a applies equally with respect to sets 34b, 34c and 34d.

As illustrated in FIG. 7, there is provided sensing means in the form of an electrical switch 86 mounted on the undersurface of plate 52a having a depending toggle arm 88. A wire 92, secured through springs 91 to a pair of upright supports 90 that are rigidly affixed to pad 54a, loosely passes through a corresponding aperture in the lower end of toggle arm 88. A pair of contacts 94 are carried by wire 92 so as to engage and flip toggle arm 88 during relative motion between plate 52a and pad 54a. Accordingly, the switch 86 and contacts 94 present sensing means that sense the relative position of pad 54a to device 22, it being remembered that plate 52a is rigidly secured to move with device 22.

FIG. 13 schematically illustrates the control means for the walking mechanism which generally includes first and second fluid flow control systems 96 and 98 which respectively control operation of the side assembly 32 and the center assembly 30. Control system 96 includes a fluid pump 100 which draws fluid from a reservoir 102 and positively displaces motive fluid through outlet 104. A pair of conduits 106 and 108 respectively extend from pump outlet 104 to opposite sides of drive cylinder 60a. Conduits 106 and 108 also extend to the opposite sides of the other drive cylinder 60b associated with side assembly 32.

Interposed in conduits 106 and 108 is a fluid flow reversing valve 110 having straight-through and crisscross positions for reversely connecting the pump outlet 104 and reservoir 102 with the opposite sides of drive cylinders 60a, b. Reversing valve 110 has a solenoid operator 112 which is electrically connected to the switch 86 shown in FIG. 7 so as to shift valve 110 alternately between its two positions as the two contacts 94 engage the toggle arm of switch 86.

The upright, weight-bearing cylinders 50a have their opposite sides respectively interconnected to conduits 114a and 116a. Conduits 114a and 116a respectively connect with conduits 106 and 108 at junctures 118 intermediate reversing valve 110 and drive cylinder 60a. Similarly, the weight-bearing cylinders 50b have their opposite sides connected with conduits 114b and 116b that connect with conduits 106 and 108 at junctures 120 intermediate reversing valve 110 and drive cylinder 60b.

Associated with each drive cylinder 60a, 60b is a fourway, three-position fluid flow reversing valve 122a and 122b having straight-through and crisscross positions for reversing flow to the opposite sides of the respective cylinders 60a and 60b. Each of the valves 122a, 122b also has a central blocking position interrupting flow to and from the associated drive cylinder. Reversing valves 122a, 122b are connected with conduits 106 and 108 at locations downstream of junctures 118 and 120 respectively.

Control system 96 also includes a passage 124 interconnecting conduits 106 and 108 upstream of reversing valve 110. A manually adjustable fluid metering valve 126 is interposed in passage 124 to variably divert a portion of the pump outlet flow directly back to reservoir 102 and thus regulate the volume of pump outlet flow that continues through conduit 106 to the cylinders 50a, 50b and 60a, 60b. A high-pressure relief valve 128 is included to prevent over-pressurization in conduit 106 in a conventional and well-known manner.

Fluid flow control system 98 is very similar to system 96, having a pump 130 with associated outlet 132 through which motive fluid is directed into conduit 134, as well as a low-pressure fluid return conduit 136 for returning exhaust fluid to reservoir 102. The pair of conduits 134 and 136 ultimately extend to the opposite sides of drive cylinders 60c and 60d which are interconnected by conduits 138. The weight-bearing cylinders 50c and 50d have their opposite sides respectively connected with conduits 140 and 142 which, in turn, connect with conduits 134 and 136 at junctures 144.

Control system 98 also includes a two-position fluid flow reversing valve 146 having an associated solenoid operator 148 and is identical in structure and operation to the reversing valve 110 of system 96. Also included is a four-way, three position control valve 150 like valves 122a, 122b; a passage 152 and associated adjustable metering valve 154 like the passage 124 and valve 126 of system 96; and a high-pressure system relief valve 156. It will be apparent, therefore, that the conduits 134 and 136 of system 98 are analogous to conduits 106 and 108 of system 96, and that the various control instrumentalities of systems 96 and 98 are similarly located and are functionally identical.

The pump outlets 104 and 132 of the two control systems are connected by a cross conduit 158 in which is disposed a manually adjustable flow restrictor 160. Restrictor 160 variably meters the flow through the cross conduit 158 to operate, in essence, as a flow divider for varying the ratio of motive fluid flow delivered to the conduits 106 and 134 of the two control systems. Cross conduit 158 interconnects with the pump outlets through bypass conduits 162 and 164 which lead to reservoir 102. Disposed within these bypass conduits is a three-position mode control valve 166 which, in its center flow blocking position illustrated, permits simultaneous operation of both control systems 96 and 98. Upon shifting valve 166 to its straight-through position, bypass conduit 162 is interconnected with reservoir 102 to return outlet flow from pump 100 directly back to reservoir 102 and thereby prohibit operation of the control system 96. It will be noted that the downstream conduit 168 is blocked by emergency shutdown valve 170 so that the discharge flow from pump 130 may continue through conduit 134 and operate control system 98. In like manner, shifting of valve 166 to its crisscross position, bypasses outlet flow from pump 130 directly back to reservoir 102 to prohibit operation of system 98 while permitting operation of system 96. Emergency shutdown valve 170 is shiftable to a flow permitting position to connect conduit 168 with reservoir 102, and when valve 170 is so positioned, neither of systems 96, 98 is operable when mode control valve 166 is in either its straight-through or its crisscross position.

The cycle of operation of structural set 34a is schematically illustrated in FIGS. 9–12. Referring to these Figures, as well as FIG. 13, rightward movement of device 22 is accomplished by placing reversing valve 122a in its crisscross position to interconnect the head end of drive cylinder 60a with the rod ends of weight-bearing cylinders 50a.

Figure 9:
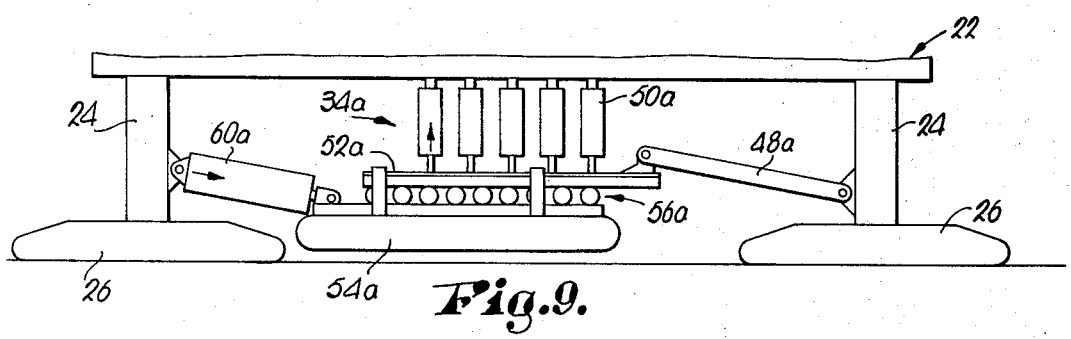
FIGS. 9–12 are partially schematic side elevational views of the walking mechanism and device and showing a side assembly at different times during its cycle of operation.

FIG. 9 illustrates the initiation of the step of moving pad 54a rightwardly. This pad-moving step occurs when reversing valve 110 is in its crisscross position to deliver pressurized motive fluid flow through conduits 108 and 116 to the head end of drive cylinder 60a and the rod ends of cylinders 50a. The raising action of cylinders 50a acting through supports 58, relieves the weight of device 22 impressed upon pad 54a and, if necessary, may lift pad 54a clear of the ground. Pressure will build in conduits 108 and 116a to the extent necessary to actuate drive cylinder 60a to move pad 54a rightwardly along the ground. As the pressure of the motive fluid builds, it will be apparent that more and more weight is relieved from pad 54a to reduce the frictional force between pad 54a and the ground that resists sliding movement of the pad.

Accordingly, initiation of extension of drive cylinder 60a and rightward movement of pad 54a will occur automatically when the pressure in conduit 108 reaches a level such that the increasing hydraulic force created by drive cylinder 60a surpasses the diminishing frictional force between pad 54a and the ground. When this pressure is reached, pad 54a shifts rightwardly ultimately to the FIG. 10 position. During this pad-moving step the reaction forces upon drive cylinder 60a are transmitted to the ground-engaging device. Roller means 56a permit the rightward movement of pad 54a relative to plate 52a which is rigidly secured to device 22. While for clarity, the pad 54a as illustrated in FIGS. 9 and 10 has been lifted completely off the ground, forward motion of pad 54a may, and usually does occur, while it is still in engagement with the ground.

Figure 10:
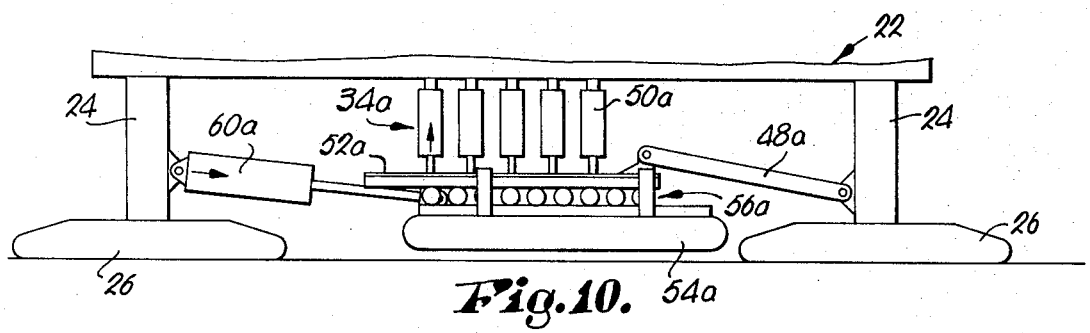

Upon approaching the end of the pad-moving step, the position of pad 54a illustrated in FIG. 10, the left-hand contact 94 illustrated in FIG. 7 will flip toggle arm 88 to actuate solenoid operator 112 and flip valve 110 to its straight-through position illustrated. Pressure fluid from pump 100 is now delivered via conduits 106 and 114a to the rod end of drive cylinders 60a and to the head ends of upright cylinders 50a.

Figure 11:
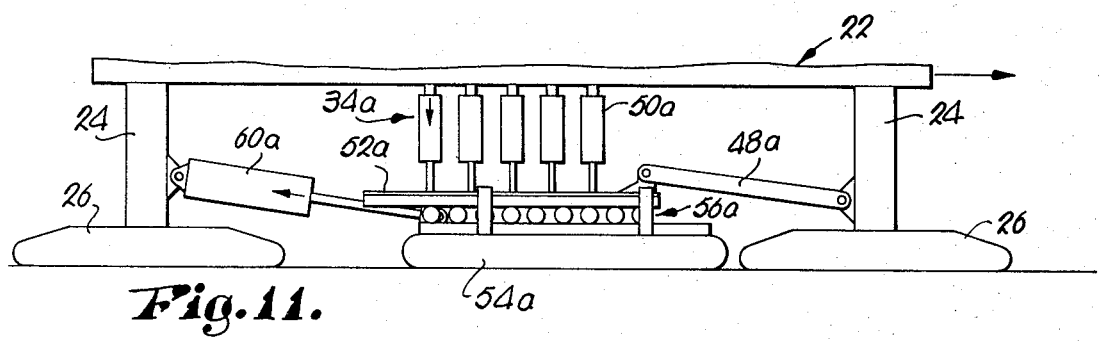

As illustrated in FIG. 11, pressure in the head ends of cylinders 50a increases to transfer more and more of the weight of device 22 to pad 54a and accordingly, greatly increases the frictional force between the pad and the ground.

When a sufficient portion of the weight of the device 22 is transferred to pad 54a the pressure in conduit 106 and the rod end of drive cylinder 60a will exert a pulling force on device 22 to slide device 22 rightwardly along the ground. The reaction forces upon drive cylinder 60a are transmitted to pad 54a which, at this time, is so heavily loaded with the weight of device 22 as to remain stationary upon the ground. The magnitude of the pressure necessary to slide device 22 is, of course, dependent upon the frictional holding force between feet 26 and the ground. This frictional force diminishes as more and more weight is shifted to pad 54a so that the device will shift at a relatively low pressure.

Figure 12:
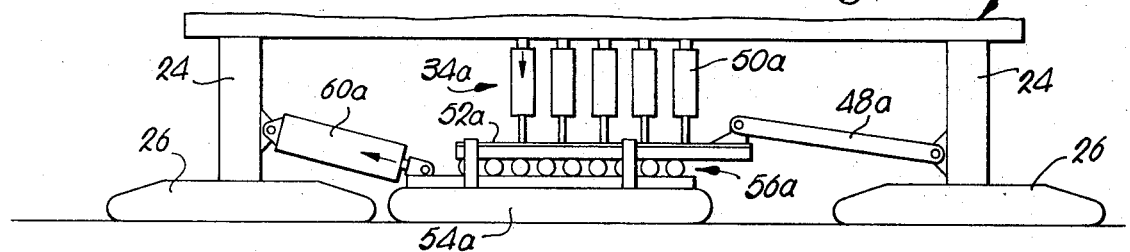

This device-moving step continues until the FIG. 12 position is approached wherein drive cylinder 60a is in the retracted condition. As the FIG. 12 position is approached, the right-hand contact 94 will engage and flip toggle arm 88 to actuate solenoid operator 112 and shift reversing valve 110 back to its crisscross position. Structural set 34a and reversing valve 110 are again in their FIG. 9 positions to initiate another cycle of operation. These pad-moving and device-moving steps repetitively continue to slide the device rightwardly along the ground in discontinuous movements.

The total effective cross-sectional area presented by the ten weight-bearing cylinders 50a is substantially greater than that presented by drive cylinder 60a. The ratio of the area of drive cylinder 60a to the total area of the weight-bearing cylinders 50a is selected to assure that a sufficient portion of the weight of device 22 is transferred to pad 54a upon initiation of the device-moving step in FIG. 11 to assure both that the pad 54a will remain stationary, and that the frictional force on feet 26 is reduced to permit sliding of the device. Preferably, the ratio of cylinder areas is selected to cause a majority of the weight of the device to be impressed upon pad 54a before initiation of the device-moving step. While all of the weight of device 22 may be impressed upon pad 54a, it has been found most advantageous to leave a certain portion of the weight upon feet 26 for stability. Also, this assures that the device will not lift up-and-down off the ground during its movement to eliminate the high stress problems associated with such action.

It will be apparent therefore, that the upright cylinders 50a present weight-transferring means for selectively relieving and loading pad 54a with a portion of the weight of the device as reversing valve 110 shifts between its two positions. The portion of the weight of the device shifted is sufficient to hold the pad stationary upon the ground when the pad is loaded. The weight-transferring means relieve sufficient weight from pad 54a during the pad-moving step to permit the pad to slide along the ground.

The interconnection of the drive cylinder 60a with the weight-transferring cylinders 50a at junctures 118, creates automatic initiation of movement of cylinder 60a when the cylinders 50a have transferred the necessary portion of the weight of the device to permit sliding of the pad in the pad moving step and the device in the device-moving step. Such arrangement has been found highly effective in moving a device across uneven and varying terrain under all conditions. The mechanism operates equally well in moving the device through very soft mud as well as across hard surfaces.

The walking mechanism will move the device with ease up hill and down hill over open country, the slope and condition of the terrain simply acting as variables in changing the magnitude of the frictional holding force between the ground-engaging feet and pads. Automatic compensation for such variables results as the operating pressure for cylinders 50a and 60a will increase or decrease in direct relation to the magnitude of the frictional force resisting sliding motion of the device. In like manner, the striking of an object by feet 26 during the travel of device 22, acts in essence, as an abrupt increase in frictional resistance and, accordingly, pressure in the head end of cylinders 50a will increase to such an extent that the entire device may be lifted off the ground and over the object engaged. If the object engaged is higher than the limited stroke of cylinders 50a, these cylinders will extend the maximum amount and then pressure will abruptly increase to attempt to shear the object engaged.

Reverse, leftward movement of device 22 in FIGS. 9–12 can be accomplished simply by placing the reversing valve 122a in its straight-through position to interconnect the respective head ends and rod ends of the drive cylinders 60a with the weight-transferring cylinders 50a. The cycle of operation is essentially the same as set forth above with the exception that leftward sliding motion of pad 54a and device 22 occur in repetitive, sequential steps in a continuing cycle.

The conduits 106 and 108 supply motive fluid to structural set 34b, as well as structural set 34a. Structural set 34b operates in the same manner as described above with respect to the structural set 34a so that these two sets, comprising side assembly 32, act in unison in sliding the device leftwardly or rightwardly.

Opposite turning motions of the device can be accomplished by placing either valve 122a or 122b in its flow-blocking position, in which case only one of the structural sets 32a or 32b operates in driving the device, while in the non-driving set weight is alternately loaded and relieved from the underlying pad. Extreme turning action, commonly referred to as a "spin turn," may be selected by placing one of the valves 122a and 122b in its straight-through position and the other in its crisscross position.

The resulting force coupled on device 22 created by driving the opposite sides thereof in different directions, causes the device to rotate approximately about its center.

The use of two structural sets 34a and 34b in the side assembly 32 therefore greatly increases the maneuvering capability of the walking mechanism while maintaining structural simplicity and simplicity in the hydraulic controls.

The control system 98 operates center assembly 30 in essentially the same cycle of action as above described with respect to side assembly 32. In this respect, it is advantageous to include sensing means, similar to the switch 86, an arrangement illustrated in FIG. 7. Such sensing means are electrically coupled to operate solenoid actuator 148 of reversing valve 146 to switch the drive cylinder 60c and 60d between their pad-moving steps and device-moving steps automatically.

The control systems 96 and 98 may be set to operate in unison so that the pad-moving steps and device-moving steps of the side assembly 32 and center assembly 30 both occur in unison. In this case, lower pressure is required in operating both of these assemblies, and the device moves in the selected direction in discontinuous steps.

Preferably, the operations of center assembly 30 and side assembly 32 are sequentially timed to cause the device to move continuously in the given direction. This is most easily accomplished simply by operating side assembly 32 in its device-moving step, while center assembly 30 is operating in its pad-moving step, and conversely, operating center assembly 30 in its device-moving step while operating side assembly 32 in its pad-moving step. The resulting continuous sliding motion of the device is particularly advantageous for movement of very heavy machinery.

It will be appreciated that the mode control valve 166 must be placed in its center flow-blocking position illustrated while operating both assemblies 30 and 32 in the continuous movement described. Such out-of-phase operation of assemblies 30 and 32 essentially transfer a given portion of the weight of the device alternately between the side pads 54a, 54b, and the center pads 54c, 54d, as these center and side pads alternately act as stationary reaction bases against which the associated drive cylinder acts in sliding the device in the desired direction.

Selective operation of only one of assemblies 30 or 32 is selected by shifting mode control valve 166 respectively to its crisscross or its straight-through position to bypass the pump output flow of the nonoperating assembly directly back to reservoir 102.

The adjustable flow restrictor 160 can selectively vary the ratio of motive fluid flow delivered through conduits 106 and 134 to the respective assemblies 32 and 30. Under certain conditions this permits both pumps 100 and 130 to serve either one of the fluid flow control systems 96 or 98.

The adjustable metering valves 126 and 154 associated with the two control systems permits precise synchronization of the operation of the two assemblies 30 and 32. For instance, if the fluid flow delivered by pump 130 operates center assembly 30 in a slightly faster cycle than the operation of side assembly 32, metering valve 154 may be opened slightly to reduce the rate of fluid flow delivered through system 98, and slowdown the operation of assembly 30 or, alternately, metering valve 126 may be closed slightly to speed up the operation of side assembly 32. Precise syncronization, particularly important when operating the entire mechanism in the continuous movement action described above, is thereby easily accomplished by fine adjustment of the two metering valves 126 and 154.

Having thus described the invention, what is claimed as new and desired to be secured by Letters Patent is:

1. Motive walking mechanism for a ground engaging device, said mechanism comprising:
    a center assembly provided with a pair of longitudinally aligned, interconnected structures;
    a side assembly presenting a pair of structures disposed at opposite sides of said center assembly;
    said center and side assemblies being disposed under the device and affixed thereto;
    each of said structures including:
        a support pad adapted to engage the ground;
        weight-transferring means for selectively relieving and loading said pad with at least a portion of the weight of the device whereby said pad is capable of respectively shifting and remaining stationary relative to the ground while so relieved and loaded;
    drive means operably engaging the device and said pads for sequentially moving the device and said pads in separate steps in a given direction; and
    control means for actuating the weight-transferring means to load and unload the pads and to actuate said drive means in said device-moving step while said pads are loaded, and in said pad-moving step while said pads are relieved.

2. Walking mechanism as set forth in claim 1, the control means for each of said assemblies being timed in operation whereby said device-moving steps of said assemblies occur in unison and said pad-moving steps of said assemblies occur in unison.

3. Walking mechanism as set forth in claim 1; and means operatively coupling said control means to said weight-transferring means to initiate said device-moving step when said pad is loaded sufficiently to remain stationary relative to the ground and to automatically initiate said pad-moving step when said pad is relieved sufficiently to shift relative to the ground.

4. Walking mechanism as set forth in claim 3, said control means further being operatively coupled to said weight-transferring means to actuate the latter.

5. Walking mechanism as set forth in claim 1; and means operatively coupling said control means with both said drive means and said weight-transferring means to actuate both of said sequentially.

6. Walking mechanism as set forth in claim 5, said control means further being operatively coupled to said weight-transferring means to load said pad with a sufficient portion of the weight of the device to allow the latter to slide along the ground in said given direction and thereupon automatically actuate said drive means in said device-moving step.

7. Walking mechanism as set forth in claim 1, said drive means including at least one hydraulic motor; said control means including a fluid flow control system having a pump with a fluid outlet, a reservoir, and first conduits connecting said pump outlet and said reservoir with opposite sides of said motor for delivery and return of motive fluid to said motor.

8. Walking mechanism as set forth in claim 7, there being a cross conduit interconnecting the pump outlets for each of said assemblies, and adjustable flow-restricting means in said cross conduit for selectively varying the ratio of motive fluid flow delivered to the motors for said assemblies.

9. Walking mechanism as claimed in claim 1, said device including ground-engaging stabilizing means disposed at each corner thereof.

10. Walking mechanism as claimed in claim 9, said stabilizing means being in the form of a leg fixedly attached at each corner.

11. Motive walking mechanism for a ground-engaging device, said mechanism including at least one assembly comprising:
    a support pad under the device and adapted to engage the ground;
    weight-transferring means for selectively relieving and loading said pad with at least a portion of the weight of the device whereby said pad is capable of respectively shifting and remaining stationary relative to the ground while so relieved and loaded;
    drive means operably engaging the device and said pad for sequentially moving the device and said pad in separate steps in a given direction;
    control means for actuating the weight-transferring means to load and unload the pad and to actuate said drive means in said device-moving step while said pad is loaded, and in said pad-moving step while said pad is relieved,
    there being a separate pair of said assemblies; and
    sensing means operatively associated with the control means of each of said assemblies for actuating the same in a timed sequence to move the device continuously in said given direction.

12. Walking mechanism as set forth in claim 4, said device-moving step of each one of said assemblies occurring during the pad-moving step of the other assembly, whereby to move the device continuously.

13. Motive walking mechanism for a ground-engaging device, said mechanism including at least one assembly comprising:
    a support pad under the device and adapted to engage the ground;
    weight-transferring means for selectively relieving and loading said pad with at least a portion of the weight of the device whereby said pad is capable of respectively shifting and remaining stationary relative to the ground while so relieved and loaded;

drive means operably engaging the device and said pad for sequentially moving the device and said pad in separate steps in a given direction; and control means for actuating the weight-transferring means to load and unload the pad and to actuate said drive means in said device-moving step while said pad is loaded, and in said pad-moving step while said pad is relieved, said control means including a fluid flow control system having a pump with a fluid outlet, a reservoir, and first conduits connecting said pump outlet and said reservoir with opposite sides of said motor for delivery and return of motive fluid to said motor, said assembly including first and second sets of support pads, weight-transferring means, and hydraulic motor drive means;

said sets being disposed at opposite sides of the device, said control means being operably connected to actuate said hydraulic motors of both of said sets in their associated device-moving and pad-moving steps, said control means including means for selectively actuating either one or both of said sets whereby to vary the direction of movement of the device.

14. Motive walking mechanism for a ground-engaging device, said mechanism including at least one assembly comprising:

a support pad under the device and adapted to engage the ground;

weight-transferring means for selectively relieving and loading said pad with at least a portion of the weight of the device whereby said pad is capable of respectively shifting and remaining stationary relative to the ground while so relieved and loaded;

drive means operably engaging the device and said pad for sequentially moving the device and said pad in separate steps in a given direction; and control means for actuating the weight-transferring means to load and unload the pad and to actuate said drive means in said device-moving step while said pad is loaded, and in said pad-moving step while said pad is relieved, said drive means being a hydraulic motor, said control means including a fluid flow control system having a pump with a fluid outlet, a reservoir, and first conduits connecting said pump outlet and said reservoir with opposite sides of said motor for delivery and return of motive fluid to said motor, said control means including a fluid flow reversing valve interposed in said first conduits and having first and second positions reversely connecting said pump outlet and reservoir with said opposite sides of the motor to actuate said drive means in said device-moving and pad-moving steps respectively.

15. Walking mechanism as set forth in claim 14, there being means for sensing the relative position of said pad to the device, means for operating said reversing valve, said sensing means connected to said operating means to automatically shift said reversing valve between its first and second positions, whereby to automatically actuate the drive means repetitively in said device-moving and pad-moving steps.

16. Motive walking mechanism for a ground-engaging device, said mechanism including at least one assembly comprising:

a support pad under the device and adapted to engage the ground;

weight-transferring means for selectively relieving and loading said pad with at least a portion of the weight of the device whereby said pad is capable of respectively shifting and remaining stationary relative to the ground while so relieved and loaded;

drive means operably engaging the device and said pad for sequentially moving the device and said pad in separate steps in a given direction; and control means for actuating said drive means in said device-moving step while said pad is loaded, and in said pad-moving step while said pad is relieved, said drive means being a hydraulic motor, said control means including a fluid flow control system having a pump with a fluid outlet, a reservoir, and first conduits connecting said pump outlet and said reservoir with opposite sides of said motor for delivery and return of motive fluid to said motor, said control means including a fluid flow reversing valve interposed in said first conduits and having first and second positions reversely connecting said pump outlet and reservoir with said opposite sides of the motor to actuate said drive means in said device-moving and pad-moving steps respectively, said weight-transferring means comprising a substantially upright, weight-bearing, hydraulic cylinder interconnecting said pad and the device, said control means further including second conduits connected with opposite sides of said weight-bearing cylinder, whereby delivery of fluid from the pump to said opposite sides of said weight-bearing cylinder respectively relieves and loads said pad with said portion of the weight of the vehicle.

17. Walking mechanism as set forth in claim 16, said second conduits being connected with said first conduits at a juncture intermediate said reversing valve and said motor, whereby said control means loads said pad and actuates said drive means in said device-moving step when said reversing valve is in its first position, and relieves said pad and actuates said drive means in said pad-moving step when said reversing valve is in its second position.

18. Walking mechanism as set forth in claim 17, said control means further including a second fluid flow reversing valve interposed in said first conduits intermediate said motor and said juncture, said second reversing valve having first and second positions reversely connecting the opposite sides of said motor with the pump and reservoir to move said device and pad in said given direction and a direction opposite thereto upon shifting said second valve between its first and second positions.

19. Walking mechanism as set forth in claim 18, and second reversing valve having a third position blocking fluid communication between said motor and the pump and reservoir, whereby said control means loads and relieves said pad of said portion of the weight of the device without actuating said motor in its device-moving step upon shifting said second reversing valve to its third position.

20. Walking mechanism as set forth in claim 17, said hydraulic motor being a double-acting, generally transversely extending linear drive cylinder having one end attached to the device and the opposite end attached to said pad.

21. Walking mechanism as set forth in claim 20, said weight-bearing cylinder having one end attached to move with said device and the opposite end operatively engaging said pad.

22. Walking mechanism as set forth in claim 21, there being roller means between said pad and weight-bearing cylinder permitting relative movement between the pad and weight-bearing cylinder in said given direction.

23. Motive walking mechanism for a ground-engaging device, said mechanism including at least one assembly comprising:

a support pad under the device and adapted to engage the ground;

weight-transferring means for selectively relieving and loading said pad with at least a portion of the weight of the device whereby said pad is capable of respectively shifting and remaining stationary relative to the ground while so relieved and loaded;

drive means operably engaging the device and said pad for sequentially moving the device and said pad in separate steps in a given direction;

control means for actuating the weight-transferring means to load and unload the pad and to actuate said drive means in said device-moving step while said pad is loaded, and in said pad-moving step while said pad is relieved, said drive means being a hydraulic motor, said control means including a fluid flow control system having a pump with a fluid outlet, a reservoir, and first conduits connecting said pump outlet and said reservoir with opposite sides of said motor for delivery and return of motive fluid to said motor, there being a pair of said assemblies; and mode operating means operatively coupled with the pumps of each of said assemblies for selectively connecting the pump outlets of one and the other of said assemblies with the reservoir in first and second modes, whereby to prohibit operation of said one assembly in the first mode and to prohibit operation of the other assembly in the second mode.

24. Walking mechanism as set forth in claim 23, said mode operating means comprising a pair of bypass conduits connecting the pump outlets of said pair of assemblies with said reservoir and a mode control valve interposed in said bypass conduits, said mode control valve having first and second positions respectively blocking flow through one and the other of said bypass conduits to effect said first and second operational modes, said mode control valve having a third position blocking flow through both of said bypass conduits to permit operation of both of said assemblies.

25. Motive walking mechanism for a ground-engaging device, said mechanism including at least one assembly comprising:

a support pad under the device and adapted to engage the ground;

weight-transferring means for selectively relieving and loading said pad with at least a portion of the weight of the device whereby said pad is capable of respectively shifting and remaining stationary relative to the ground while so relieved and loaded;

drive means operably engaging the device and said pad for sequentially moving the device and said pad in separate steps in a given direction; and control means for actuating the weight-transferring means to load and unload the pad and to actuate said drive means in said device-moving step while said pad is loaded, and in said pad-moving step while said pad is relieved, said drive means being a hydraulic motor, said control means including a fluid flow control system having a pump with a fluid outlet, a reservoir, and first conduits connecting said pump outlet and said reservoir with opposite sides of said motor for delivery and return of motive fluid to said motor, there being a pair of said assemblies, the control means of each of said assemblies including an adjustable fluid metering valve interposed in a passage interconnecting said first conduits, whereby adjustment of said metering valves synchronizes operation of said assemblies.

* * * * *